United States Patent [19]
Draper

[11] 4,073,189
[45] Feb. 14, 1978

[54] FLUID FLOW MONITORING DEVICE

[75] Inventor: Robert N. Draper, Boring, Oreg.

[73] Assignee: Western Skyways, Inc., Portland, Oreg.

[21] Appl. No.: 707,621

[22] Filed: July 22, 1976

[51] Int. Cl.² ............................................. G01F 1/28
[52] U.S. Cl. .................................................. 73/228
[58] Field of Search ............... 73/228, 186; 336/30; 340/239 R

[56] References Cited

U.S. PATENT DOCUMENTS

| 2,484,022 | 10/1949 | Esval | 340/187 |
| 2,724,969 | 11/1955 | Bloser | 73/228 |
| 2,735,299 | 2/1956 | Blackburn et al. | 73/228 |
| 2,802,956 | 8/1957 | Jarosh et al. | 73/516 R |
| 2,933,298 | 4/1960 | Allison | 73/516 R |
| 2,939,319 | 6/1960 | Machlanski | 73/228 |
| 3,147,620 | 9/1964 | Stapler | 73/228 |
| 3,190,128 | 6/1965 | Weir | 336/30 X |
| 3,287,968 | 11/1966 | Kenyon | 73/186 |

Primary Examiner—James J. Gill
Attorney, Agent, or Firm—Klarquist, Sparkman, Campbell, Leigh, Hall & Whinston

[57] ABSTRACT

A fluid flow monitoring device includes a housing defining a fluid flow passageway. A vane positioned within this passageway moves to positions which vary in accordance with the rate of fluid flow therethrough. An armature coupled to the vane pivots to positions corresponding to the vane positions. A submersible transformer in proximity to the armature produces an output signal indicative of the armature position and the fluid flow rate. The output signal is fed to a meter where the fluid flow rate is represented. A bypass passageway is provided for fluid flow therethrough in the event the fluid passageway becomes obstructed.

12 Claims, 4 Drawing Figures

FLUID FLOW MONITORING DEVICE

BACKGROUND OF THE INVENTION

1. Field of the Invention

The present invention relates to fluid flow monitoring devices, and more particularly to a device of the type having a vane member positioned in a fluid flow path for movement to positions which vary in accordance with the fluid flow rate.

2. Description of the Prior Art

Existing fluid flow meters typically have a housing defining a fluid flow path and a vane positioned within the path so that it moves to positions which vary depending on the rate fluid flows in the path.

An indicator, for example the pointer of a gauge, is commonly positioned within the housing and coupled to the vane either mechanically, or by an arrangement of permanent magnets, to provide an indication of the vane position and hence of the fluid flow rate. However, this often proves unsatisfactory because in many cases the housing must be placed at locations, for example under the hood of a vehicle, making the indicator inaccessible for convenient monitoring.

In addition, various types of mechanisms requiring moving mechanical linkages, such as rotating shafts, have been suggested for coupling the vane to an indicator which is remote from the housing. In addition to the complexity, bulky size, and cost of such systems, expensive seals are required to make the housing fluid tight at the point where the moving shaft or other linkage passes from the interior to the exterior thereof.

Another common drawback of existing flow meters are the numerous moving parts which may jam and make the devices inoperable until time consuming repairs are completed. Furthermore, such devices often lack reliability because there is no provision for fluid flow in the event the fluid flow path becomes obstructed, as when the vane becomes jammed.

Moreover, existing devices are not easily adaptable for a wide range of flow monitoring operations.

One type of flow meter utilizing a transformer is disclosed in the Manual of Electromechanical Devices (citation below). However, this device also suffers from many of the deficiencies noted above.

Flow metering devices illustrative of the known prior art and of the foregoing problems are disclosed in U.S. Pat. Nos. 2,939,319; 2,892,348; 2,724,969; 2,248,030; 2,029,633; 3,224,270; 3,282,102; 3,393,563; 3,559,197; and on page 314 of the Manual of Electromechanical Devices by Douglas C. Greenwood, published in 1965 by McGraw-Hill, Inc.

SUMMARY OF THE INVENTION

The present invention is a compact flow monitoring device having a housing defining a fluid flow passageway. A vane member in the fluid flow passageway moves to positions which vary in accordance with the rate of fluid flow in the passageway. An armature responsive to the vane member pivots to positions corresponding to the positions of the vane member. A transformer placed in proximity to the armature provides an electrical output signal indicative of the position of the armature and consequently, of the fluid flow rate. This output signal may be fed to a display, or meter, at a location remote from the housing.

According to one aspect of the present invention, the vane is pivoted to the housing by a shaft. The shaft extends into a transducer chamber also defined by the housing. The armature is mounted to the shaft for movement in a fixed positional relationship with the vane member.

In accordance with another feature of the present invention, the transformer is a submersible transformer positioned within the transducer chamber. Consequently, the need for a complex and costly fluid tight seal between the fluid flow passageway and transducer chamber is eliminated.

Another feature of the present invention is the ease at which the relationship of the transformer output to the fluid flow rate may be controlled. This control is accomplished by the substitution of an armature of one shape for an armature of a different shape. Therefore, the device may be readily adapted for use in a large variety of applications.

According to still another feature of the invention, the transformer has a three-legged core with secondary windings each wound around one of the outer legs of the core. The secondary windings are interconnected to produce a net transformer output signal corresponding to the position of the armature relative to the legs of the core and hence to the fluid flow rate.

A more specific feature of the invention is a vane biasing mechanism which has an easily accessible calibration mechanism for adjustment thereof to calibrate the device.

A still further feature of the invention which may be provided is a bypass passageway and relief mechanism to permit the continued passage of fluid through the device in the event the fluid flow passageway becomes obstructed.

A primary object of the invention is to provide an improved fluid flow monitoring device which is compact, easily accessible for purposes of adjustment and maintenance, and highly reliable.

Another primary object is to provide an improved fluid flow monitoring device which eliminates the need for complex and costly seals.

Still another primary object is to provide an improved fluid flow monitoring device which is versatile and readily adaptable for use in a great variety of applications.

An additional object is to provide an improved fluid flow monitoring device which minimizes the number of moving parts.

A further object is to provide an improved fluid flow monitoring device for indicating the rate of fluid flow in a conduit at a location remote from the conduit.

A still further object is to provide an improved flow monitoring device which is mechanically simple and inexpensive to construct.

The foregoing and other objects, features and advantages of the present invention will become more apparent from the following detailed description which proceeds with reference to the accompanying drawings.

DETAILED DESCRIPTION OF A PREFERRED EMBODIMENT

Figure 1:
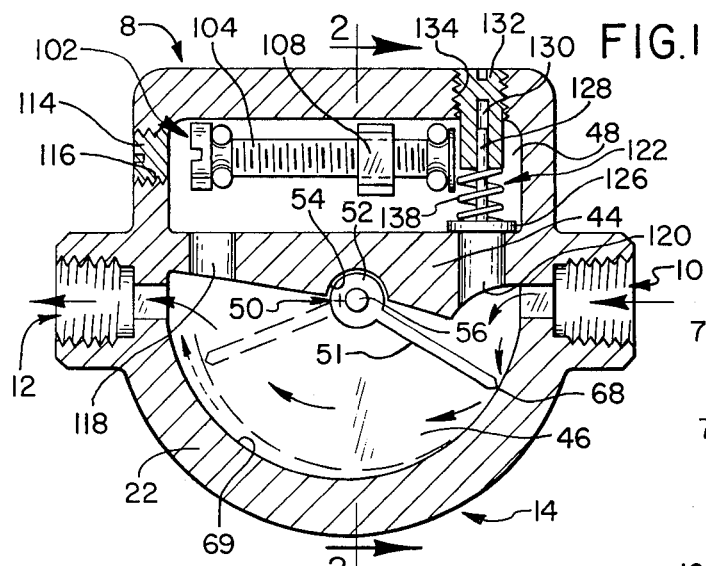
FIG. 1 is a vertical sectional view of the fluid flow monitoring device of the present invention.
Figure 2:
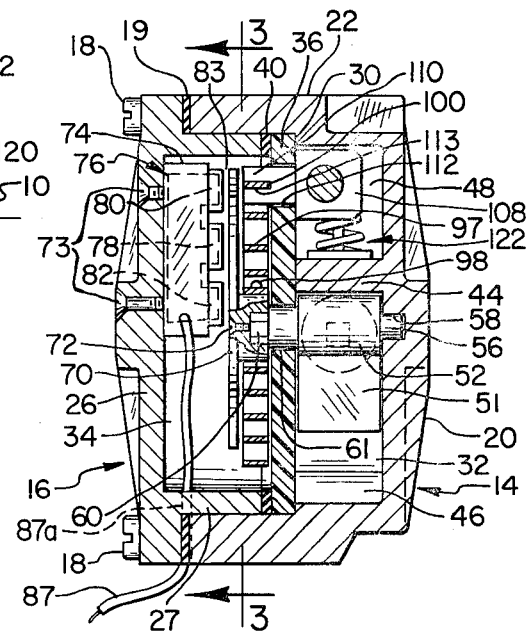
FIG. 2 is a vertical sectional view of the device of the present invention taken along lines 2—2 of FIG. 1.

Referring to FIGS. 1 and 2, the fluid flow monitoring device of the present invention includes a generally hollow housing 8 provided with an inlet port 10 and an outlet port 12. The ports are adapted for connection in series with an associated fluid conduit, such as a fuel line supplying fuel from a fuel source, to an associated engine of a vehicle.

The housing 8 comprises a cover 14 and a cup-shaped body 16 which are secured together by screws 18. The members 14 and 16 preferably are cast aluminum or similar rigid, sturdy, lightweight material. The cover 14 includes a ribbed face portion 20 and a side wall portion 22 which extends perpendicularly away from the face 20 towards the body 16. The body comprises a main plate-like portion 26 and a cylindrical flange 27. The flange is spaced inwardly from the outer peripheral edge of the main body portion 26 to define a seat for a gasket 19. When the housing is assembled, the flange 27 telescopes snugly within the side wall 22. The housing 8 is separated into a fluid flow chamber 32 and a transducer chamber 34 by a partition 36, the periphery of which is clamped between the end of the flange 27 and a lip 30 formed on the side wall 22. The partition 36 may be made of glass filled nylon or similar material. A gasket 40 is provided between the end of the flange 27 and the partition 36 to help seal the housing. The cover 14 also includes a wall 44 which extends from the face portion 20 to the partition 36 and across the cover to separate the fluid flow chamber 32 into a lower main fluid passageway 46 and an upper bypass passageway 48. The passageway 46 is generally in the shape of a segment of a cylinder having its axis at 50. The ports 10, 12 are in communication with the passageway 46 so that fluid normally flows from inlet port 10 through the passageway 46 to outlet port 12 (as shown by the arrows in FIG. 1).

Figure 5:
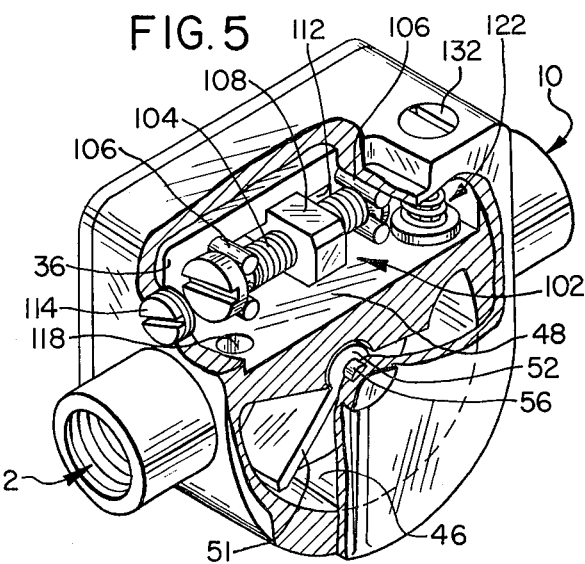
FIG. 5 is a perspective view of the device of the present invention partially in section.

A vane 51 (FIG. 5) is mounted for pivoting movement within the passageway 46 upon a shaft having an enlarged central portion 52 which extends between the wall 20 and the partition 36. The shaft portion 52 is positioned within a semicircular recess 54 (FIG. 1) formed in the lower surface of the wall 44. A reduced end portion 56 (FIG. 2) of the shaft pivots within a bore 58 in the face portion 20. The shaft includes a bearing portion 60 seated in an opening 61 in the partition 36. The axis of the shaft is parallel to but displaced from the axis 50 of the main fluid passageway 46 toward the inlet 10. Conveniently, the vane 51 and the shaft are of single piece construction and formed out of glass filled nylon. The vane is generally rectangular in shape having a width just slightly less than the width of the passageway 46 and a length such that when the vane is in its position nearest the inlet the distance between its outer edge 68 and the interior surface 69 of the wall 22 is minimal and the vane substantially blocks the fluid path between the ports through the passageway 46.

When so mounted, pivoting the vane 51 from its position nearest the inlet toward the outlet will cause the distance between its outer edge 68 and the interior surface 69 to progressively increase, as shown in phantom in FIG. 1, resulting in an increased area through which fluid may flow. The force of fluid impinging on the vane pivots the vane toward the outlet to a position where this force is balanced by an opposing force applied by the vane. This opposing force can be due to the weight of the vane, or to a biasing mechanism such as described below. Therefore, during normal operation, the vane will pivot through an angle which corresponds to the rate fluid is flowing between the ports.

An armature 70, preferably of soft iron, is positioned within the transducer chamber 34. The illustrated armature is generally oval-shaped, plate-like, and secured eccentrically to the end of shaft bearing portion 60 by a screw 72. The shaft bearing portion 60 projects into the transducer chamber 34 for this purpose. Consequently, movement of the vane causes the armature to pivot and maintain positional relationship with the vane.

Referring to FIG. 2, a transformer 74 is mounted by screws 73 to the main body portion 26 and has a core 76 positioned in proximity to the armature 70. The core 76 is preferably three-legged, and most preferably E-shaped, having a central leg 78 and a pair of outer legs 80, 82. The core is arranged so that the end of each leg extends toward, but terminates short of, the armature. Therefore, a gap 83, typically within the range from 0.025 to 0.030 inches, exists between the end of each leg and the armature.

Figure 4:
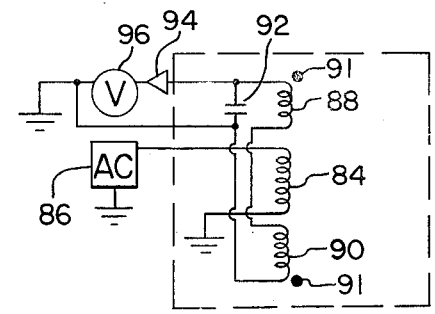
FIG. 4 is a schematic diagram of a circuit utilized in the present invention.
Figure 6:
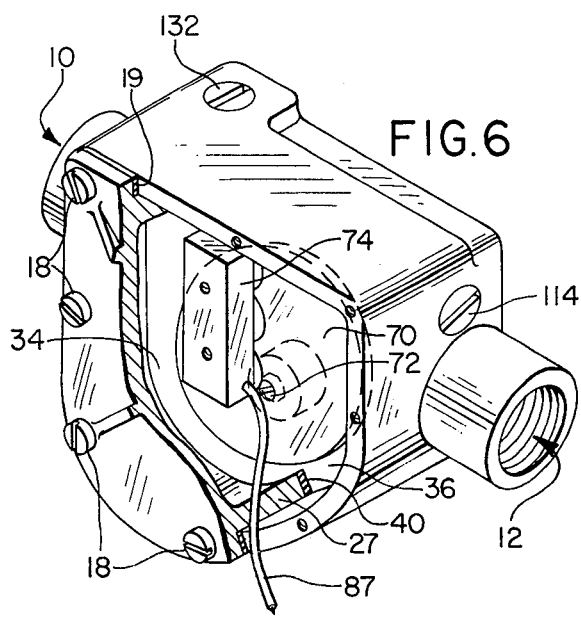
FIG. 6 is a partially cut away perspective view of the opposite side of the device.

As shown in FIG. 4, the transformer 74 has a primary winding 84 which is wound around central leg 78 and connected to an AC voltage source 86 by primary wires of the conductors 87 which pass through a small hole 87a in flange 27 and between the end of wall 22 and the main body portion 26. Source 86 provides a 10 volt regulated sinusoidal excitation signal at a frequency typically in the range from 400 Hertz to 4 Kilohertz. A secondary winding 88 is wound around outer leg 80 and connected in series with a matching secondary winding 90 which is wound around outer leg 82. The relative polarities of windings 88, 90 are opposing as shown by the polarity dots 91. It should be noted that these windings need not be wound around that portion of their associated legs which extend toward the armature.

The difference in voltage induced in windings 88 and 90 appears across a capacitor 92 connected in parallel with windings 88, 90. This difference constitutes a net transformer output signal which is fed to an amplifier 94. In turn, the amplified signal is fed to a display such as voltmeter or gauge 96. The meter may include a scale calibrated to give a visual representation of the flow rate in, for example, gallons or pounds per hour. It is evident that the meter may be placed in the cab of a vehicle while at the same time the housing may be installed at a remote location, such as in a fuel line under the hood of the vehicle.

Figure 3:
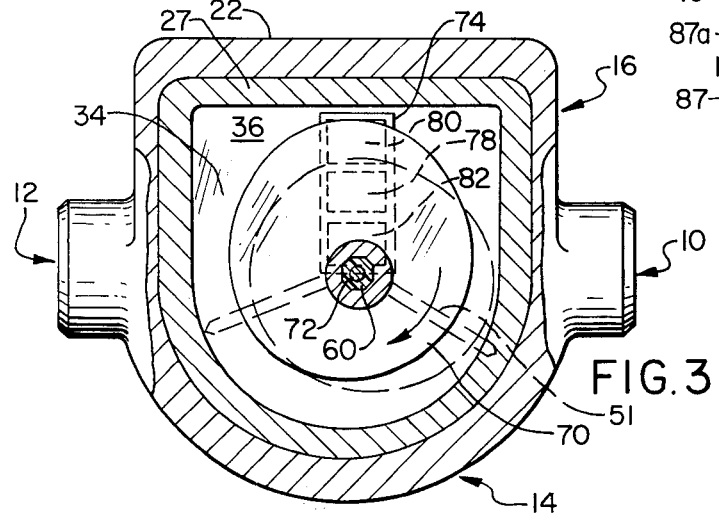
FIG. 3 is an elevation view partially in section of the device taken along line 3—3 of FIG. 2.

As shown in FIG. 3, pivoting the armature 70 from a first position shown in solid lines to a second position shown in phantom, progressively changes the relative amount that the armature overlies the outer legs 80, 82 of the core. Thus, a portion of the end of leg 80 previously covered is uncovered, that is, it is no longer positioned directly beneath the armature, while at the same time, the end of leg 82 has remained largely covered. The magnetic flux passing through outer leg 80 and linking winding 88 with primary winding 84 decreases as the end of leg 80 is uncovered to result in a decrease in the voltage induced in winding 88. On the other hand, the magnetic flux passing through outer leg 82 and linking winding 90 with primary winding 84 remains generally constant to result in a substantially constant voltage induced in winding 90. Consequently, pivoting the armature 70 changes the flux linking winding 88 relative to the flux linking winding 90 to thereby affect the net transformer output signal. When the armature 70 is in the first, or reference, position, both outer leg 80 and 82 are almost entirely covered and the vane 51 is in its position nearest the inlet. At this position of the armature and the vane the voltages induced in windings 80, 82 substantially balance one another to produce a minimum, or null, net transformer output signal. When the vane is pivoted to another position, the outputs from windings 88 and 90 become unbalanced and produce a net transformer output signal which differs from the null output signal. In this way, the net transformer output signal can be made to vary with each position of the armature and vane and hence with each rate of fluid flow between the ports.

The generally oval-shaped armature 70, mounted as described, produces a net transformer output signal which is generally linearly related to the fluid flow rate. However, one important advantage of the present invention is that by merely changing the contour of the armature it is possible to alter the relationship between the net transformer output signal and the fluid flow rate. For example, the armature can be shaped and mounted to produce a null net transformer output signal until the flow rate is at least two gallons per minute and produce a maximum net output signal when the rate is four gallons per minute. Therefore, information concerning flow rates from two to four gallons per minute will then be expanded over the full scale of the meter 96. In this way, by merely making the easily accomplished and inexpensive substitution of an armature of a first shape for one of a second shape, the device can be utilized in widely varying applications.

In accordance with the present invention, the transformer 74 is a submersible transformer. This being the case, the transducer chamber 34 and the main fluid passageway 46 need not be fluid tight with respect to one another. Consequently, complex and costly sealing of the interface between the partition 36 and the shaft bearing portion 60 is not required. Instead, the fluid being measured may seep between such members to lubricate the bearing surface 60 and fill the transducer chamber 34. Fluid in the transducer chamber 34 also serves to damp the motion of armature 70 and thereby steady it.

In the illustrated embodiment, a biasing means is provided for urging the vane in opposition to the force of fluid impinging thereon. Conveniently, this biasing means comprises a coil spring 97, see FIG. 2, positioned between the armature 70 and the partition 36 having one end connected to shaft bearing portion 60 at 98 and its second end coupled to a calibration mechanism 102.

The calibration mechanism 102 (FIG. 5) is provided to adjust the tension applied by the spring 97 to the shaft bearing portion 60 to calibrate the device. Adjustment of the mechanism alters the amount of resistance of the vane to the force of fluid impinging thereon thereby controlling the position to which the vane pivots in response to a given fluid flow rate. Consequently, the net transformer output signal corresponding to this flow rate is also changed.

More particularly, calibration mechanism 102 includes an externally threaded control rod 104 positioned within the bypass passageway 48. The control rod 104 is rotatably attached to the partition 36 and hence coupled to the housing by snap fits 106 which each receive one end of the rod. An internally threaded traversing block 108 is retained on the control rod 104 so that rotation of the rod causes block 108 to move along the longitudinal axis of the rod. The end 110 (FIG. 2) of the block 108 extends through a generally rectangular slot 112 in the partition 36. The slot 112 is elongated and has a longitudinal axis which is generally parallel to control rod 104. The second end of the spring 97 is held in a slot 113 provided in the end 110 of the block 108. Therefore, movement of the traversing block adjusts the tension applied by the spring to the shaft bearing portion 60.

An externally threaded plug 114 (FIG. 1) is received by threaded bore 116 provided in the cover 14. The plug 114 may be removed for access to the control rod 104. The traversing block, snap fits and the control rod may be made of glass filled nylon or similar material. Reliability of the device is increased because the tension applied to the spring 97 on the block 108 tends to lock the block in position along the control rod 104 and prevent the device from becoming uncalibrated during use.

The wall 44 (FIG. 1) is provided with holes 118, 120 which communicate between the bypass passageway 48 and the main fluid passageway 46. A check valve 122 is provided to block the bypass fluid pathway from the inlet side of the vane member 51 through the hole 120, bypass passageway 48, and hole 118 to the outlet side of the vane member. The check valve 122 includes a valve seat 126 positioned to close the hole 120 during normal operation of the device. A stem 128 extends upwardly from the seat 126 and is slidably received by a bore 130 formed in an externally threaded plug 132 retained in threaded bore 134 in the side wall 22. A coil spring 138, positioned between the plug 132 and the valve seat 126, urges the valve seat toward the hole 120 to close it. The force applied by the spring 138 on the valve seat 126 can be adjusted by tightening or loosening the plug 132. Furthermore, the plug 132 can be removed to provide access to the check valve 122 in the event maintenance of the check valve is required.

When the pressure differential from the inlet side of the vane 51 to the outlet side exceeds the level predetermined by the force applied by the spring 138 on the valve seat 126, valve 122 opens and fluid may flow through the bypass pathway. This buildup in the pressure differential may occur, for example, if the vane becomes stuck because of debris flowing between the ports. Thus, even though the vane is jammed, fluid may continue to flow through the device. Therefore, immediate on the spot repairs of the device are not required so that if installed in a vehicle, the vehicle can continue to its destination. It should be pointed out that jamming or other malfunctioning of the device is minimized by its mechanical simplicity and because the only basic moving part within the housing is the vane and the armature assembly. Furthermore, this assembly is continuously lubricated by the fluid flowing between the ports.

OPERATION

The operation of the present invention will be described with reference to its installation in the fuel line of an internal combustion engine. When the engine is stopped, no fuel flows between the ports. Consequently, the vane 51 is urged by the spring 97 towards a reference position and a null net transformer output signal is produced to provide a null indication at the meter.

When the engine is started, fuel flows between the ports 10, 12 and causes the vane 51 to pivot to a position corresponding to the rate of fluid flow in the fuel line. Movement of the vane 51 in turn pivots the armature 70. Consequently, a net transformer output signal related to the position of the armature 70 and to the fuel flow rate is fed to the meter 96 and the engine operator is provided with a visual representation of the fuel flow rate.

Having illustrated and described the principals of my invention with reference to one preferred embodiment, it should be apparent to those persons skilled in the art that such invention may be modified in arrangement and detail without departing from such principals. I claim as my invention all such modifications as come within the true spirit and scope of the following claims.

I claim:

1. A device for indicating a fluid flow rate comprising:
   a housing;
   partition means for separating said housing into first and second chambers, said first chamber having an inlet port and an outlet port and defining a path for fluid flow between said ports;
   a shaft extending through an opening in said partition and projecting at least partially into both of said chambers, the opening being of sufficient size to allow pivoting of said shaft and to allow fluid to pass therethrough around said shaft;
   a vane connected to said shaft and disposed at least partially in the first chamber in the path intermediate said ports for movement to positions which vary in accordance with the rate of fluid flow in the path, and wherein movement of said vane causes said shaft to pivot;
   armature means positioned in said second chamber and connected to said shaft, wherein pivoting of said shaft causes said armature means to move from one position corresponding to one position of said vane to other positions each corresponding to a separate other position of said vane;
   transformer means positioned in proximity to said armature means and responsive to the position of said armature means for receiving an input excitation signal and for producing an output signal corresponding to the rate of fluid flow in the path.

2. An apparatus for indicating a fluid flow rate comprising:
   a hollow housing having an inlet port and an outlet port, said housing including a partition separating the interior of said housing into a main fluid chamber and a transducer chamber, said partition defining an opening between said chambers, and wherein the inlet and outlet ports are in communication with the main fluid chamber for fluid flow therethrough between the ports;
   a shaft pivoted to said housing, said shaft extending through said opening and projecting at least partially into both said chambers, the opening being of sufficient size to allow fluid to pass through said opening to lubricate said shaft and at least partially fill said transducer chamber;
   a vane carried by said shaft and positioned at least partially in said main fluid chamber for movement from a vane reference position when no fluid is flowing between said ports to other vane positions which vary in accordance with the rate of fluid flow between said ports, wherein movement of said vane pivots said shaft;
   armature means carried by said shaft and positioned within said transducer chamber, wherein movement of said shaft moves said armature means to positions corresponding to said vane positions; and
   a submersible transformer means positioned within said transducer chamber in proximity to said armature means, said transformer means including primary winding means for receiving an excitation signal, and secondary winding means for producing a transformer output signal varying in accordance with the position of said armature means and corresponding to the rate of fluid flow in the path.

3. The apparatus according to claim 2 wherein said transformer is at least partially submerged in the fluid within the transducer chamber and the movement of said armature is damped by the fluid within the transducer chamber.

4. The apparatus according to claim 2 wherein said transformer means includes a three legged core comprising a middle leg and a pair of outer legs, said primary winding means being wound around said middle leg, said secondary winding means comprising a pair of innerconnected matched secondary windings, each being wound around one of said outer legs, said armature means being positioned in overlying relationship to said primary winding means and to said pair of secondary windings, and wherein when said armature means is in a first position corresponding to said vane reference position it overlies said middle and outer legs so that the output of each said secondary winding is balanced by the output from the other said secondary winding to produce a null net transformer output signal, and when said armature means is in other positions it overlies one of said outer legs differing amounts from said first position so that the outputs from each said secondary winding are not balanced by one another and a net transformer output signal is produced corresponding to the position of said armature means from said first position and to the rate of fluid flow in the path.

5. The apparatus of claim 4 including biasing means for biasing said vane toward said vane reference position.

6. The apparatus of claim 5 including source means for providing an excitation signal to said primary winding means and indicating means for receiving said transformer output signal and for providing a visual representation of said received signal at a location spaced apart from said housing.

7. The apparatus of claim 5 wherein said housing also defines a bypass passageway communicating between the inlet side and outlet side of said vane;
   said apparatus also including valve means disposed in said bypass passageway for closing said bypass passageway when the pressure differential from the inlet side to the outlet side of said vane is below a predetermined value.

8. The apparatus of claim 5 wherein said biasing means comprises a coil spring connected at a first end to said shaft and calibration means for adjusting the tension of said spring, said calibration means comprising an externally threaded control rod rotatably mounted to said housing, an internally threaded traversing block retained on said control rod and connected to the second end of said spring so that rotation of said control rod causes said traversing block to move along the longitudinal axis of said control rod to thereby adjust the tension of said spring.

9. The apparatus according to claim 8 wherein said armature means is substantially oval-shaped and is eccentrically mounted to said shaft.

10. The apparatus according to claim 8 wherein said main fluid chamber is substantially in the shape of a segment of a cylinder having an axis parallel to and displaced from said shaft, said housing including an interior wall bounding the outer periphery of said cylindrical segment, said vane comprising a substantially rectangular vane, wherein the distance between the edge of said vane opposite said shaft and said interior wall vary with the positions of said vane and with the rate of fluid flow in the path.

11. An apparatus for indicating a fluid flow rate comprising:

a hollow housing having an inlet port and an outlet port, said housing including a partition separating the interior of said housing into a fluid flow chamber and a transducer chamber which are in communication with one another, said housing also including a wall member separating the fluid flow chamber into a main fluid passageway and a bypass passageway, and wherein the inlet and outlet ports are in communication with the main fluid passageway for fluid flow therethrough between the ports;

said wall member having a first opening communicating between the inlet side of the main fluid passageway and said bypass passageway and a second opening communicating between the outlet side of the main fluid passageway and the bypass passageway;

valve means disposed in said bypass passageway for closing said bypass passageway when the pressure differential from the inlet side to the outlet side of said valve means is below a predetermined value;

a shaft pivoted to said housing and extending through said partition at least partially into said transducer chamber and into said main fluid passageway;

a vane carried by said shaft and positioned in said main fluid passageway for pivoting movement about the axis of said shaft from a vane reference position when no fluid is flowing in the path to other vane positions which vary in accordance with the rate of fliud flow in the path, wherein movement of said vane pivots said shaft;

biasing means for urging said vane toward said vane reference position in opposition to the force of fluid impinging on said vane;

adjustment means for changing the bias applied by said biasing means;

a generally oval-shaped armature positioned within said transducer chamber and eccentrically mounted to the end of said shaft for pivoting movement in response to the movement of said shaft; and a submersible transformer positioned within said transducer chamber in proximity to said armature means for producing a transformer output signal varying in accordance with the position of said armature means and corresponding to the rate of fluid flow in the path, said transformer including a generally E-shaped core comprising a central leg and a pair of outer legs, primary winding means wound on said central leg for receiving an excitation signal, and a pair of interconnected matched secondary windings, each being wound around one of said outer legs, and wherein when said armature means is in a first position corresponding to said vane reference position it overlies the end of said central leg and the ends of said outer legs so that the output of each said secondary winding is balanced by the output from the other said secondary winding to produce a null net transformer output signal, and when said armature means is in other positions it overlies the end of one of said outer legs differing amounts from said first position so that the outputs from each said secondary winding are not balanced by one another to produce a net transformer output signal which differs from said null transformer output signal.

12. The apparatus of claim 11 wherein said partition has an elongate slot communicating between the bypass passageway and the second chamber, said biasing means comprises a coil spring positioned in said transducer chamber and connected at a first end to said shaft, and said adjustment means comprises an externally threaded control rod positioned in said bypass passageway and parallel to said slot and rotatably mounted to said housing, an internally threaded traversing block retained on said control rod and extending through the slot into said second chamber, said traversing block being connected to the second end of said spring so that rotation of said control rod causes said traversing block to move along the longitudinal axis of said control rod to thereby adjust the tension of said spring.

* * * * *